United States Patent Office 2,816,913
Patented Dec. 17, 1957

2,816,913

PREPARATION OF SUBSTITUTED ACIDS

Charles E. Frank, Cincinnati, and John R. Leebrick, Miamiville, Ohio, assignors to National Distillers and Chemical Corporation, a corporation of Virginia No Drawing. Application November 25, 1953, Serial No. 394,497

8 Claims. (Cl. 260—515)

This invention relates broadly to a process for synthesizing dimerized derivatives and, more particularly, it relates to a novel method for preparing aromatic substituted dimerized derivatives by selective dimerization of vinyl aromatic compounds.

It is an object of this invention to react aromatic hydrocarbons having a vinyl grouping with an alkali metal under selective conditions to obtain the corresponding dimetallo derivatives of dimers of the vinyl aromatic hydrocarbons.

It is another object to provide a method in which the additional step of carbonating the dimetallo derivatives is carried out to form salts of aromatic substituted dicarboxylic acids. These salts may be readily converted to diacids and isolated as such, if desired.

A further, more specific object of this invention is to prepare substituted hexanedioic acids by selective dimerization of styrene in the presence of metallic sodium to yield disodio-derivatives which may subsequently be carbonated to yield ultimately as product, substantially pure 2,5-diphenyl-1,6-hexanedioic acid.

Other objectives of the invention will become apparent from the detailed description set forth below.

Previous work has shown that certain disubstituted ethylenes may, under different conditions than herein described, undergo some dimerization. However, it has not been possible to dimerize, in appreciable yields, compounds of the vinyl aromatic type, that is, those containing the vinyl grouping, —HC=CH$_2$, for example, styrene and ring substituted styrenes.

The invention is carried out by selectively dimerizing vinyl aromatic compounds such as styrene in the presence of finely dispersed sodium or potassium in a suitable liquid medium and in the presence of a relatively small amount of a polycyclic aromatic hydrocarbon at a temperature below about 0° C.

The disodium dimerized derivatives thus obtained are then preferably carbonated at a temperature below 0° C. to give the salts of the desired dicarboxylic acids in high yields and selectively. Acidification gives the corresponding acids.

The dimerization reaction of styrene, for example, under suitable conditions yields a dimerized disodium derivative. The general course of the reaction has been determined by studies of the diacids arising therefrom after carbonation. Thus, the selective dimerization reacts as follows to yield the indicated products:

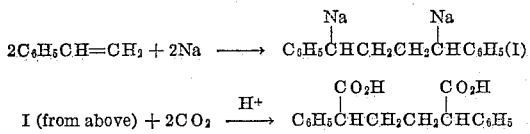

Thus, it has been found that the product predominantly formed is the isomer which yields 2,5-diphenyl-1,6-hexanedioic acid (2,5-diphenyl adipic acid) after carbonation. Other isomeric diacids are possible from the styrene condensation. Other isomers which can theoretically be obtained are the following:

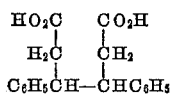

3,4-diphenyl-1,6-hexanedioic acid

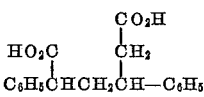

2,4-diphenyl-1,6-hexanedioic acid

By experiments it was possible to demonstrate the high selectivity of the reaction to give the 2,5-diphenyl-1,6-hexanedioic acid. The yields of the other isomers were negligible.

The dimerizing or coupling of the styrene type compounds proceeds quite selectively under the described conditions. The major side reaction of the styrene is polymerization from which polystyrene results. The procedure of the invention results in selective dimerization of the vinyl aromatic compound and, in addition, yields the desired isomer.

The vinyl aromatic compounds which are useful for this selective process comprise styrene and ring substituted styrenes such as, for example, the ortho, meta and para methyl styrenes, the ethyl styrenes, and the like. In general, it is desirable to use styrene and alkyl substituted styrenes in which the alkyl group has 1 up to 4 carbon atoms; however, aryl substituted styrenes may also be employed. The method is particularly well adapted to the use of styrene as the vinyl aromatic compound.

If the vinyl aromatic reactant used is other than styrene, then the dimetallic derivatives corresponding to such structure is obtained. The generalized formula for these products is as follows:

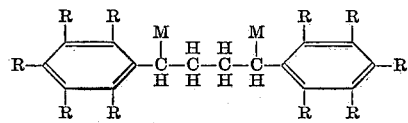

In the above formula, the R groups need not all be similar and may represent either an alkyl group having from 1 to 4, inclusive, carbon atoms or a hydrogen atom. The M represents either an atom of sodium or potassium, depending on the alkali metal reactant used.

Either sodium or potassium may be used as the alkali metal reactant. The use of sodium is preferred over potassium since sodium gives excellent selectivity and yields of dimerized products, and it is cheaper and more readily available. Chemically pure sodium is not essential, however, since mixtures containing a major proportion of sodium are also useful. Thus, alloys of sodium with potassium, calcium and the like can be used.

One factor essential to the successful production of the dimerized derivatives is the use of the alkali metal in finely dispersed form. A sodium dispersion in which the average particle size is less than 50 microns is desirable for the dimerization reaction. This dispersion is most conveniently made in an inert hydrocarbon as a separate step preliminary to reaction with the vinyl compound.

The reaction medium most suitable consists essentially of an ether, and certain types of ethers are especially effective. These particular classes of ethers have the common property of serving as promoters for the dimerization. The ether can be any aliphatic mono ether having a methoxy group, in which the ratio of the number of oxygen atoms to the number of carbon atoms is not less than 1:4, and which will not be cleaved during the reaction period to produce sufficient catalytic cleavage products to consume appreciable amounts of the styrenes by polymerization side reactions. Examples include dimethyl ether, methyl ethyl ether, methyl n-propyl ether, methyl isopropyl ether, and mixtures of these methyl ethers. Certain aliphatic polyethers are also quite satisfactory. These include the acyclic and cyclic polyethers which are derived by replacing all of the hydroxyl hydrogen atoms of the appropriate polyhydric alcohol by alkyl groups. Typical examples are the ethylene glycol dialkyl ethers such as the dimethyl, methyl ethyl, diethyl, methyl butyl, ethyl butyl, dibutyl, and butyl lauryl ethylene glycol ethers; trimethylene glycol dimethyl ether, glycerol trimethyl ether, and glycerol dimethyl ethyl ether. The simple methyl monoethers, as dimethyl ether, and the polyethers of ethylene glycols, such as ethylene glycol dimethyl ether are preferred.

The ethers should not contain any groups such as hydroxyl, carboxyl and the like which are distinctly reactive towards sodium. Although the ether may react in some reversible manner, it must not be subject to cleavage to give irreversible reaction products during the dimerization process. Such cleavage action destroys the ether and introduces into the reacting system metallic alkoxides which, in turn, tend to induce the polymerization reaction rather than the desired dimerization reaction.

Inert reaction media can be employed in limited amounts. In general, these inert media will be introduced with the sodium dispersion as the liquid in which the sodium is suspended. They have the principal effect of diluting the ethers. The concentration of ether in the reaction mixture should at all times be maintained at a sufficient level to have a substantial promoting effect upon the dimerization reaction.

It is also desirable to include in the dimerization reaction mixture a relatively small amount of at least one compound of the polycyclic aromatic class. By this term it is intended to include both condensed ring hydrocarbons such as naphthalene and phenanthrene, as well as the uncondensed polycyclic compounds such as diphenyl, the terphenyls, dinaphthyl, tetraphenyl ethylene, and the like. It is also intended to include mixtures of these compounds. The compounds such as diphenyl and the terphenyls and their mixtures have been found to be particularly useful. The amount of the hydrocarbon required will vary over a range which in every case will be relatively small in comparison with the amount of vinyl compound undergoing dimerization. The exact amount in any particular reaction will depend on temperature, time of reaction and the chemical structure of the reactant material. Concentrations in the range of 0.1 to 10 wt. percent based on amount of vinyl aromatic compound are ordinarily quite sufficient.

It is a further requirement in the process that the reaction temperature preferably be held below 0° C. The temperature range between —20 and —75° C. is the preferred one. Generally speaking, the styrenes undergo extensive polymerization at temperatures above 0° C. with the result that a great deal of polystyrenes are formed rather than the desired disodium dimers.

It has also been found advantageous to carry out the dimerization of the vinyl aromatic compound in the presence of at least one solid friable attrition agent. These activating materials have been found especially valuable for increasing the reaction rate where the dimerization is done in attrition type apparatus such as a ball mill or pebble mill. Friable materials are those which are relatively easily pulverized in this type of apparatus. These materials can further be used either alone or in conjunction with the polycyclic aromatic compounds. Materials which are suitable for use as the solid friable attrition agents include inorganic solids such as alkali metal salts, for example, sodium chloride, sodium sulfate, and potassium sulfate. Also useful is the class of compounds which consist of metallic and non-metallic oxides which are not reactive with metallic sodium under the reaction conditions, for example, sand (silicon dioxide), diatomaceous earth (Cellite), zircon, and rutile. Carbon, such as in the form of graphite, can also be used. The material can be utilized in a number of ways. For instance, it can be utilized by the addition to the reaction zone of a suitable attrition agent which has been preground or otherwise adjusted to a satisfactory, useful particle size. On the other hand, a relatively coarse size salt or oxide can be added to a pebble mill or ball mill and, while in contact with the solid alkali metal, the friable attrition agent is ground down to effective size.

The reaction may be carried out in a stirred reaction vessel. In one typical method for carrying out the invention, the sodium or potassium dispersion is initially prepared by placing an inert hydrocarbon in a suitable vessel with the appropriate weight of sodium. Using finely dispersed sodium it is only necessary to employ an equimolar amount with the vinyl compound to be dimerized. Although a slight excess may be added, it is unnecessary. The mixture is heated in a surrounding bath or otherwise until the sodium has melted, temperature 97–99° C. Then a suitable high speed agitator is started and, preferably, an emulsifier consisting, for example, of ½% (based on sodium) of the dimer of linoleic acid is added. After a short period of agitation a test sample of the dispersion shows the particle size to be in the 5–15 micron range. The stirring is stopped and the dispersion is allowed to cool to room temperature. This dispersion is now ready to be used in the herein described selective dimerization. Any dispersion having sufficiently finely divided sodium or potassium will suffice. For example, completely saturated dibutyl ether, isooctane, normal octane, n-heptane, or straight run kerosenes, may be employed as suspension media for the dispersion. Other well-known substances may be used instead of the dimeric linoleic acid as the dispersing agent. The dispersion is cooled to and maintained below 0° C. and the vinyl compound introduced.

This reaction may be carried out either in a batchwise or in a continuous manner, and it is not intended to limit the process to any particular method of operation.

The dimetallic derivatives of the dimers which are selectively formed are produced in the reaction mixture. These products, depending on the initial reactant and the reaction medium, may be either soluble or insoluble in the final reaction mixture.

These dimetallic derivatives constitute novel compositions. They can either be isolated as such, or, since they tend to be unstable and difficult to handle, they can be directly and immediately thereafter subjected to further reactions to form valuable derivatives. For example, subsequent carbonation of the mixture containing the products yields the salts of dicarboxylic acids. The carbonation may be done by subjecting the dimetallic derivatives to dry gaseous carbon dioxide or by contact with solid carbon dioxide. The temperature should be controlled below 0° C. to avoid formation of large amounts of unwanted by-products and decomposition of the intermediates. These salts will contain two more carbon atoms than the dimetallic dimers from which they are produced. In the case where styrene is the starting vinyl compound, there results by this method the selective production of diphenyl-1,6-hexanedioic acids, the 2,5-diphenyl-1,6-hexanedioic acid isomer predominating in the products. Both the meso and racemic dl mixture are produced. In the case where the vinyl toluenes are the starting vinyl aromatic materials, there results as the final product after carbonation, a mixture of the isomeric ditolyl adipic acids.

It is important, when producing the diacids and their salts, to carry out the dimerization and carbonation as two separate steps. The dimetallic dimer is first made and the carbonation is done as soon afterwards as possible.

The diacid salts are water soluble and may easily be separated by a water extraction. Alternatively, they may be converted to the free acids by acidification and separated by filtration, evaporation, and/or solvent extraction.

These diacid products can be used as chemical intermediates, and in the preparation of polyesters, polyamides, alkyd resins, plasticizers, and synthetic lubricants.

The invention will be described in greater detail by the following examples. These examples and embodiments are illustrative only and the invention is not in any way intended to be limited thereto except as indicated by the appended claims. All parts are expressed as by weight unless otherwise specified.

*Example 1*

About 360 parts of ethylene glycol diethyl ether and 2 parts o-terphenyl were charged to a stirred reactor in which a nitrogen atmosphere was maintained. A dispersion, consisting of 12.2 parts of metallic sodium dispersed in about 50 parts of n-butyl ether (average particle size 20 microns) was added to the reactor. The mixture was cooled to about −60° C. About 26 parts of styrene admixed with about 180 parts of ethylene glycol diethyl ether was added slowly to the reactor over a period of 4 hours. During this period rapid agitation of the reacting mixture was maintained.

After completion of the styrene addition, the entire reactor contents were poured onto an excess of crushed solid carbon dioxide while maintaining continuous stirring.

After the unreacted carbon dioxide had sublimed, the reaction mixture was quenched by the addition of about 200 parts of water. The water and organic solvent layers were separated and the solvent layer washed with portions of sodium carbonate solution.

These wash portions were added to the water layer and the resulting total mixture was acidified to a pH of about 5 using concentrated hydrochloric acid. The diphenyl adipic acid product precipitated. The crude acid was washed with small portions of benzene-ethanol mixture in a 6:1 ratio. The pure acid product was obtained as a white powder in about 36% yield. This product showed a neutral equivalent of 150 compared to the theoretical value of 149.

Another experiment was carried out similar in every way to that described above except that the dimerization was done at −25° C. rather than at −60° C. The carbonation was also carried out at −25° C. Substantially the same yield of diphenyl adipic acids was obtained as in the above described experiment.

*Example 2*

About 9.5 parts of the diphenyl adipic acid product obtained as described in Example 1 above was dissolved in a hot mixture of benzene and ethanol (11:1 volume ratio). The solution was concentrated to about 85% of its initial volume. On cooling, 0.65 parts of solid material, melting at 248° C., crystallized. Continued stepwise concentration and filtration of the precipitated solid material gave a total of six fractions as shown below.

| Fraction No. | 1 | 2 | 3 | 4 | 5 | 6 |
| --- | --- | --- | --- | --- | --- | --- |
| Weight, pts. | 0.65 | 1.85 | 0.10 | 2.95 | 1.5 | 0.5 |
| M. P., °C. | 248 | 245 | 205 | 203 | 203 | 203 |

Fractions No. 1 and 2 were combined and recrystallized twice from glacial acetic acid, giving colorless crystals, M. P. 259–260° C. Further recrystallization did not change the melting point. This material is presumably the meso form of 2,5-diphenyl-1,6-hexanedioic acid. The elemental analysis of this product was as follows:

|  | Calculated for $C_{18}H_{18}O_4$ | Found |
| --- | --- | --- |
| Carbon | 72.47 | 72.3 |
| Hydrogen | 6.08 | 6.0 |
| Neutral equiv | 149 | 151 |

Fractions No. 4 and 5 were combined and recrystallized three times from glacial acetic acid to yield material melting at 208° C. Further recrystallization did not change the melting point. This material is presumably the dl-2,5-diphenyl-1,6-hexanedioic acid.

The elemental analysis of this product was as follows:

|  | Calculated for $C_{18}H_{18}O_4$ | Found |
| --- | --- | --- |
| Carbon | 72.47 | 72.5 |
| Hydrogen | 6.08 | 6.2 |
| Neutral equiv | 149 | 151 |

*Example 3*

In order to show the chemical structure of the diphenyl hexanedioic acid product formed, the disodium derivative initially formed was reacted with water rather than with carbon dioxide. Thus, the product formed is a diphenylbutane rather than a diphenyl hexanedioic acid. The structure of the diphenylbutane produced establishes the corresponding structure of the disodio derivative from which it was subsequently formed.

The sodium dispersion was prepared as in Example 1 and added to a solution of p-terphenyl in ethylene glycol diethyl ether solvent. The solution was reacted with styrene as described before. The disodium derivative was then treated with excess water. The organic solvent and water layers were separated and the water layer discarded. The solvent was stripped from the organic layer, the residue was dissolved in a small amount of toluene and ethanol added to precipitate the polystyrene polymer. This precipitated polymer was separated by filtration, the solvents removed by distillation and the residue distilled under reduced pressure. The fraction boiling at 140° C. at 15 mm. pressure was isolated and allowed to crystallize at room temperature. After recrystallization from ethanol, this product melted at 52–53° C. This melting point did not change after further recrystallizations. A mixture of this material with a known sample of 1,4-diphenylbutane gave no depression in melting point.

This experiment indicates that about 90–95% of the disodium derivative formed is the isomer leading to the 2,5-diphenyl hexanedioic acid. A small quantity (not more than 10%) of oil, indicating the formation of other diphenyl-butane isomers, was also obtained.

*Example 4*

About 10 parts of sodium chloride, about 300 parts of dimethyl ether and about 1 part of o-terphenyl were charged to a ball mill reactor. A 50% dispersion (13.2 parts) of sodium in isooctane was added with stirring and the reactor cooled to −40° C. Vinyltoluene (a mixture of m- and p-isomers) amounting to 29.5 parts (0.25 mole) in 25 parts isooctane was introduced over a 3-hour period with efficient grinding being maintained during the addition. Upon completion of the vinyltoluene addition, the ball mill contents were poured immediately on crushed solid carbon dioxide.

The solid residue obtained after evaporation of solvents was quenched with steam. Water was added and the mixture filtered to remove polymer. The clear solution was acidified to Congo red test paper with hydrochloric acid. The ditolyladipic acids precipitated readily. The crude product was washed with benzene and recrystallized from glacial acetic acid. The product was a mixture of α, α'-di-(m- and p-) tolyladipic acids having a neutral equivalent of 167 compared to the theoretical 163, M. P. 220°–240° C.

What is claimed is:

1. A selective dimerization process which comprises reacting (1) a vinyl aromatic compound from the group consisting of styrene and styrene having an alkyl substituent for a nuclear hydrogen atom with (2) a finely dispersed alkali metal in (3) a reaction medium consisting substantially of an ether selected from the group consisting of aliphatic monoethers having a methoxy group and an oxygen to carbon ratio of not less than 1:4 and polyethers derived from an aliphatic polyhydric alcohol having all the hydroxyl hydrogen atoms replaced by alkyl groups and mixtures thereof, in the presence of (4) a relatively small amount of a polycyclic aromatic compound at (5) a temperature of below about 0° C. to provide a reaction mixture comprising dialkali metal dimers of the vinyl aromatic compound.

2. A process, as defined in claim 1, wherein the polycyclic aromatic compound is a polycyclic aromatic hydrocarbon.

3. A process, as defined in claim 2, wherein the vinyl aromatic compound is styrene, the alkali metal is sodium, the reaction medium is dimethyl ether, the polycyclic aromatic hydrocarbon is present in from about 0.1 to about 10 weight percent based on the styrene, and the temperature is from about −20 to about −75° C. to provide a reaction mixture comprising disodio derivatives of a dimer of styrene.

4. A process, as defined in claim 3 wherein the polycyclic aromatic is a terphenyl.

5. A process, as defined in claim 1, wherein, in a subsequent step, carbonating said dialkali metal dimer of the vinyl aromatic compound to form the corresponding dialkali metal salts of dicarboxylic acids having two more carbon atoms per molecule than the dimer of said vinyl aromatic compound.

6. A process, as defined in claim 5, wherein the carbonation step is carried out at a temperature of below about 0° C.

7. A process, as defined in claim 3, wherein, in a subsequent step, carbonating the disodio dimers of styrene unseparated from said reaction mixture to convert the disodio dimers to diphenyl hexanedioic acid.

8. A process, as defined in claim 7, wherein the carbonation step is carried out at below about 0° C.

References Cited in the file of this patent

UNITED STATES PATENTS

| 2,171,867 | Scott et al. | Sept. 5, 1939 |
| 2,352,461 | Walker | June 27, 1944 |
| 2,716,662 | Cohen et al. | Aug. 30, 1955 |

OTHER REFERENCES

Conant et al.: J. A. C. S., vol. 50, pp. 551–8 (1928).
McElvain et al.: J. A. C. S., vol. 73, p. 450 (1951).
Hansley: Ind. & Eng. Chem., vol. 43, pp. 1759–66 (1951).